United States Patent [19]

Haass

[11] 4,012,590

[45] Mar. 15, 1977

[54] CIRCUIT ARRANGEMENT FOR TWO-WIRE FULL DUPLEX DATA TRANSMISSION

[75] Inventor: Adolf Haass, Munich, Germany

[73] Assignee: Siemens Aktiengesellschaft, Munich, Germany

[22] Filed: Oct. 28, 1975

[21] Appl. No.: 625,870

[30] Foreign Application Priority Data

Oct. 31, 1974 Germany .................... 2451913

[52] U.S. Cl. .................................. 178/58 R
[51] Int. Cl.² ................................. H04L 5/14
[58] Field of Search ............... 178/58, 59, 60; 343/175, 176

[56] References Cited

UNITED STATES PATENTS 3,927,257  12/1975  Copenhafer ................ 178/60

Primary Examiner—Thomas A. Robinson
Attorney, Agent, or Firm—Gerald L. Lett

[57] ABSTRACT

A circuit arrangement for providing full duplex data communication over two wires is described. Each station connected to the two wires contains a transmitter and receiver. The receivers are connected across the two lines; a balancing resistor connects one of the two lines to each receiver. The balancing resistors are adapted so that transmitter operation in a given station does not interfere with reception. The receivers produce measuring signals for aiding in the reception of data from other stations. The measuring signals are equal in value to the difference between two currents; the first current is that which flows through a transmitter and the two lines in a given station, and the second current is that which flows through the transmitter and the balancing resistor in a given station.

6 Claims, 7 Drawing Figures

CIRCUIT ARRANGEMENT FOR TWO-WIRE FULL DUPLEX DATA TRANSMISSION

BACKGROUND OF THE INVENTION

This invention relates to a circuit arrangement for two-wire full-duplex data transmission via two lines from a station comprising a transmitter and receiver to another station also comprising a transmitter and receiver.

In a known data transmission system, transmitters and receivers are each arranged in first and second stations, and, using four-wire operation, the transmitter in the first station is connected by two lines to the receiver in the second station, and the transmitter in the second station is connected by two further lines to the receiver in the first station. In this system the internal resistance of the transmitter amounts to approximately 0 Ohms, and the internal resistance of the receiver amounts to approximately 200 Ohms. Under this condition a favorable pulse rise time characteristic is achieved for the transmission of pulse-like data signals, and this characteristic results in low telegraphic distortions.

In another known data transmission system, in each case a transmitter and a receiver are arranged both in the region of a first station and a second station, but in this case the two stations are connected to one another during two-wire operation by two lines. The transmitter and the receiver in each station are each connected to a bridge circuit. Two resistors each having a value of 200 Ohms form a first and a second bridge resistance. The third bridge resistance is formed by the two lines and by the circuit arrangements of the other station which are connected to the lines. The fourth bridge resistance is formed by a balancing resistor. The transmitter is connected at two diagonal points of this bridge circuit, and the receiver is connected to the two other diagonal points.

As is true in four-wire operation, an obvious course for two wire operation would be to dimension the first and second bridge resistor at 200 Ohms. However, since in two-wire operation the transmitter in a station is connected in series with the second bridge resistor of 200 Ohms, then, considered from the other station, the transmitter has an internal resistance of 200 Ohms. This results in a substantially impaired pulse rise time characteristic in comparison to the conditions of four-wire operation.

In order to achieve a similar pulse characteristic for two-wire operation, as in four-wire operation, an obvious course would be to dimension both the first and the second bridge resistors in the two stations at in each case 100 Ohms. However, this measure would have the disadvantage that the maximum range in two-wire operation would thereby be reduced to half the maximum range in four-wire operation.

An object of the invention is, therefore, to provide a circuit arrangement which, in simple fashion, permits the use of two-wire operation, instead of four-wire operation, without any reduction in the maximum range of transmission during two-wire operation and without increasing the telegraphy distortions.

SUMMARY OF THE INVENTION

In accordance with the invention, the foregoing and other objects are achieved in a circuit arrangement where measuring devices are connected at their inputs to first and second circuit points, and the measuring signals produced by these measuring devices are equal to the difference between two currents. One of the aforementioned currents flows via the transmitter in a given station and via the two lines, and the other current likewise flows through the transmitter in a given station and also via the balancing resistor in that station.

The circuit arrangement in accordance with the invention is characterized in that it facilitates two-wire operation, instead of four-wire operation, in simple fashion, without changing the maximum range of data transmission. This advantage may be achieved since the circuit arrangement offers the possibility of employing the same internal resistances in the receiver both in four-wire operation and in two-wire operation, for example, an internal resistance of 200 Ohms, although in two-wire operation the two-wire line is terminated with a different resistance of, for example, 100 Ohms. In this way it is possible to increase the maximum loop resistance permitted in two-wire, full duplex operation from 1 kOhms to 2 kOhms.

It is advantageous to provide in the transmitter with two voltage sources, the poles of which are connected to voltages of opposite polarities, and of which one is connected to the lines and the other to the balancing resistor. The measuring signal of the measuring device then signals the sum of the currents flowing through the two voltage sources. In this way it is possible to very precisely adjust the balancing resistors, since the currents flowing across the lines and those flowing across the balancing resistors can be made equal in terms of amount with very great accuracy.

In contrast, in the prior art data transmission system mentioned hereinabove, it is more difficult to dimension the first and second bridge resistances to be exactly equal so that the voltages connected to these bridge resistors are equal while the transmitter of the other station is not in operation.

If d.c. voltages must also be transmitted across the lines of the data transmission system it is advantageous to connect one of the two voltage sources to a voltage inverter which forms the second voltage source and which is constructed with the aid of an operational amplifier.

If no d.c. voltages need to be transmitted across the lines of the data transmission system, it is advantageous to construct the two voltage sources using a transformer having a primary winding connected to a generator of the transmitter and a secondary winding possessing a central tap which is to be considered as a pole of both voltage sources. The other poles of the two voltage sources are then formed by the two ends of the secondary coil. A transformer of this type is of relatively low cost and produces precisely equal voltages of opposite polarity.

In order to realize the measuring device at a low cost, it is advantageous to provide an operational amplifier which possesses a non-inverting and an inverting channel, wherein the non-inverting channel is connected to a circuit point of constant potential. In this case the inverting channel is connected to the first and second circuit point, a resistor is connected in parallel to the inverting channel, and the receiver is connected to the two ends of the resistor.

BRIEF DESCRIPTION OF THE DRAWINGS

In the following, exemplary and preferred embodiments of the invention will be described making reference to FIGS. 1 to 7, in which identical components shown in more than one figure have been provided with like references.

DETAILED DESCRIPTION OF THE PREFERRED EMBODIMENTS

Figure 1:
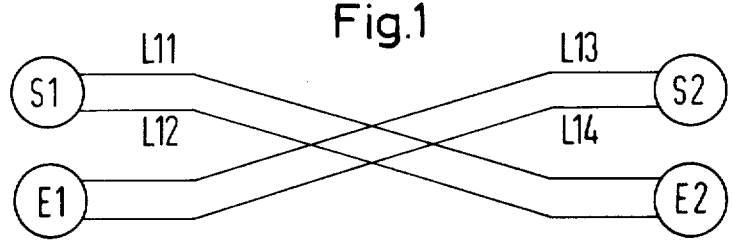
FIG. 1 is a schematic view of a four-wire full duplex data transmission system.

The four-wire, full duplex data transmission system illustrated in FIG. 1 comprises a first station having a transmitter S1 and a receiver E1, and a second station having a transmitter S2 and a receiver E2. The transmitter S1 is connected via the lines L11, L12 to the receiver E2 in the other station. Similarly, the transmitter S2 is connected by the lines L13 and L14 to the receiver in the other station E1. The internal resistance of the transmitter S1, considered from the receiver E2, amounts to approximately 0 Ohms. Similarly, the internal resistance of the transmitter S2, considered from the receiver E1, likewise amounts to approximately 0 Ohms. The input resistances of the receivers E1 and E2 amount to approximately 200 Ohms. If pulse-like data signals are transmitted across the lines L11, L12, L13, L14, then under the imposed conditions, an optimum pulse build-up or rise time characteristic with low telegraphy distortion is achieved.

Figure 2:
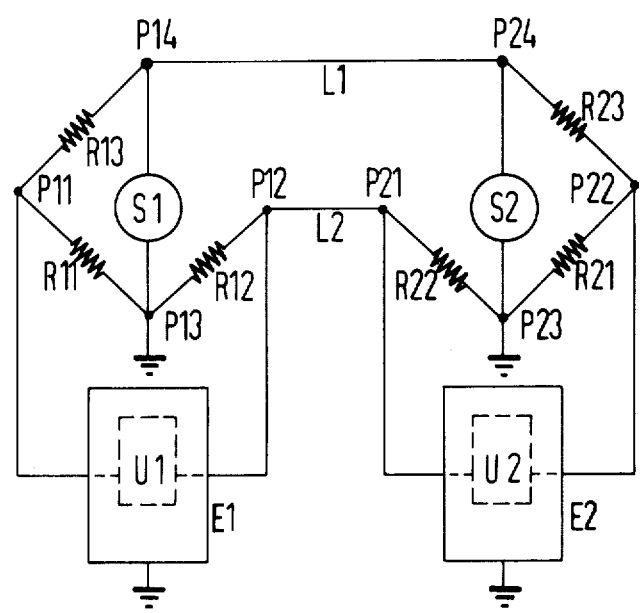
FIG. 2 is a schematic diagram of a two-wire full duplex data transmission system in which the received items of data are determined from voltage differences.

The two-wire, full duplex data transmission system illustrated in FIG. 2 likewise comprises a first station and a second station which are now, however, connected to one another by merely two lines L1 and L2. The transmitter S1, the receiver E1 with the voltage measuring device U1 and the resistors R11, R12, R13 are arranged in the first station. The transmitter S2, the receiver E2 with the voltage measuring device U2 and the resistors R21, R22, R23 are arranged in the second station.

A bridge circuit is constructed in each of the two stations. The resistors R11 and R12 form a first and second bridge resistance. A third bridge resistance is formed by the lines L1, L2 and by other components which are connected to terminals P21 and P24. The resistor R13 forms the fourth bridge resistance. The voltage measuring device U1 is connected to terminals P11, P12 and thus the one bridge diagonal. The transmitter S1 is connected to terminals P13, P14 and thus to a second bridge diagonal. The resistors R11 and R12 are of like values. In order to facilitate a full duplex operation over the two lines L1 and L2, the balancing resistor R13 is dimensioned in such manner that it is equal to the bridge resistance connected to the terminals P12 and P14. Under this condition, signals can be emitted from the transmitter S1 and transmitted across the lines L1 and L2 without the station's own receiver E1 being disturbed.

In the other station is arranged a bridge circuit of similar construction, in which the resistor R23 forms the balancing resistor. When the transmitter S2 emits signals, the station's own receiver E2 is not disturbed, and the signals are transmitted via the lines L1, L2 to the other station, as a result of which a different voltage drop occurs across the resistor R12 to that which occurs across the resistor R11. The voltage measuring device U1 responds to the difference between the voltages across these resistors R11 and R12, and controls the receiver E1 which analyses the received signals.

Basically, it is desirable to also employ the transmitters S1 and S2 and receivers E1 and E2 illustrated in FIG. 1 in the data transmission system shown in FIG. 2. Thus, it is initially assumed that the internal resistances of the transmitters S1 and S2 amount to approximately 0 Ohm. It is also assumed that the bridge resistors R11, R12, R21, R22, which are to be considered as receiver input resistors, each have a value of 200 Ohms. Since the transmitter S1 is connected in series with the resistor R12, the internal resistance of the transmitter, considered from the receiver E2, no longer amounts to 0 Ohms, but to approximately 200 Ohms. This results in a poorer pulse build-up characteristic than in the transmission system in FIG. 1, and considerable telegraphy distortions can be expected. In order to improve the pulse build-up characteristic, it would be possible to provide each of the resistors R11, R12, R21, R22 with a value of 100 Ohms. This measure would be disadvantageous, however, since it would cause the maximum range attainable in two-wire operation to be reduced by half in comparison to the maximum range in four-wire operation.

Figure 3:
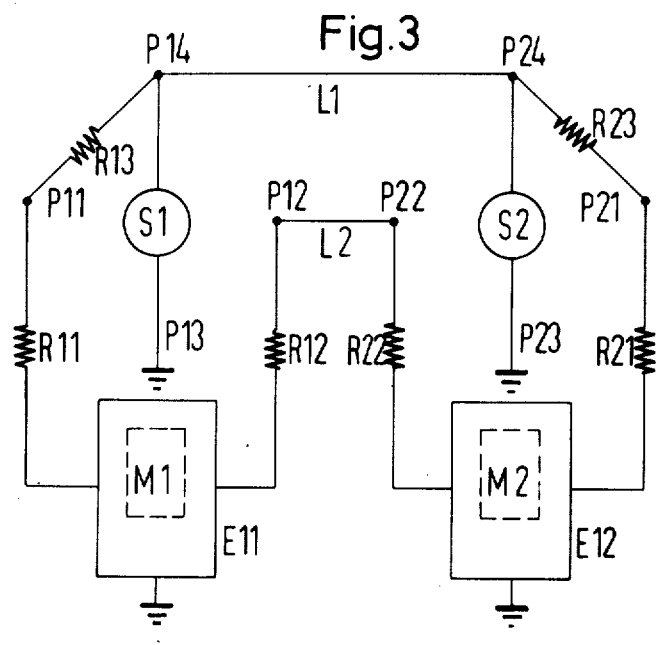
FIG. 3 is a schematic diagram of a two-wire full duplex data transmission system, in which the received items of data are determined from current differences.

FIG. 3 shows another data transmission system, which in addition to the aforementioned components, also contains a receiver E11 having a measuring device M1 and a receiver E12 having a measuring device M2. The balancing resistors R13 an R23 are balanced in the same way as in the system shown in FIG. 2. Instead of the voltage measuring device U1 shown in FIG. 2, in FIG. 3 the measuring device M1 is provided for emitting a measuring signal which is dependent upon the difference between two currents. One current flows through the transmitter S1, terminal P14, lines L1, L2, terminal P12, resistor R12, measuring device M1 and via ground to terminal P13. The other of these two currents flows through transmitter S1, terminal P14, resistor R13, terminal P11, resistor R11, measuring device M1 and via ground to terminal P13.

When the balancing resistor R13 is correctly balanced, and when the transmitter S2 is not emitting any signals, the current flowing from terminal P11 to the measuring device M1 is equal to the current flowing from terminal P12 to the measuring device M1. The two currents compensate one another so that the receiver E11 is not disturbed during the operation of the transmitter S1.

When the transmitter S2 is in operation and is emitting signals via the lines L1, L2, different currents flow across terminal P11 and via terminal P12 to the measuring device M1. The measuring signal emitted from the measuring device M1 serves to signal the difference between the in-flowing currents to the receiver E11, which is thus able to receive the transmitted items of data. Since the measuring device M1 acts in the manner of a current-adding element, the internal resistance of the receiver E11 can be provided with a value of 200 Ohms, like the four-wire transmission system in FIG. 1, although the lines L1, L2 are terminated with only 100 Ohms, because the resistors R11, R12, R21, R22 can each be provided with values of 100 Ohms. It is, thus, possible to increase the maximum permissible resistance of the lines L1, L2 to double the amount, for example, from 1 kOhm to 2 kOhms, so that the same maximum range can be achieved in two-wire operation as in four-wire operation.

In the circuit arrangement illustrated in FIG. 3 the resistors R11 and R12 are not required as bridge resistances, as now the voltage drop across these resistors is not measured. However, it is advantageous to nevertheless allow these resistors R11 and R12 to remain in order to limit the currents conducted to the measuring device M1.

Figure 4:
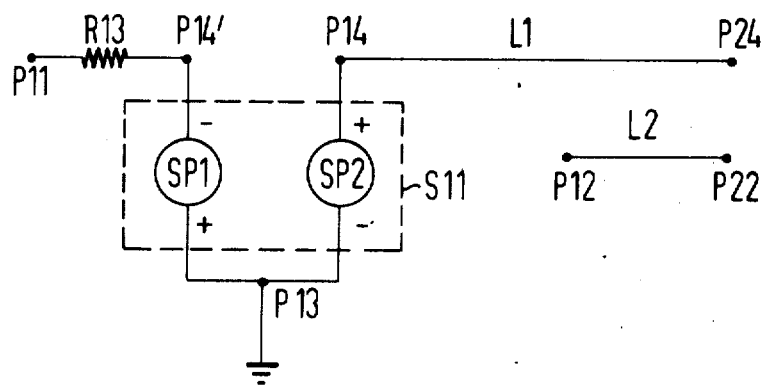
FIG. 4 is a fundamental circuit diagram of two voltage sources arranged in the transmitter.

FIG. 4 is a fundamental circuit diagram of the transmitter S11 which could be used in place of the transmitter S1 represented in FIG. 3. This transmitter S11 contains two voltage sources SP1, SP2, which emit two voltages which are equal in amount but of opposite polarities. It will be assumed that during the operation of this transmitter S11 the voltages of the two voltage sources SP1, SP2 are used to produce the data signals transmitted by lines L1 and L2, wherein electronic switches (not shown) serve to switch the two voltage sources SP1, SP2 on and off selectively. Details in this respect will not be discussed since this is not the subject of this invention.

Using the two voltage sources, a first circuit is produced, commencing from the voltage source SP1 and leading through terminal P14′, dummy resistor R13, and terminal P11 to measuring device M1 and back via ground to terminal P13 and the voltage source SP1. A second current flows from the voltage source SP2 via terminal P14, lines L1, L2 and terminal P12 to the measuring device M1 and via earth back to terminal P13 and the voltage source SP2. The two currents flowing through the voltage sources SP1 and SP2 are now oppositely directed, so that the measuring device M1 must respond to the sum of these two currents. The dummy resistor R13 must be compensated in such manner that during the transmitting intervals of the transmitter S2 represented in FIG. 3, the two currents flowing through the voltage sources SP1 and SP2 exactly compensate one another. Generally, the compensation of the balancing resistor R13 using the two mutually compensating currents can be effected with substantially more accuracy than a compensation effected on the basis of two equal voltage drops across the equal resistors R11 and R12 represented in FIG. 2, using the voltage measuring device U1. The transmitter S2 illustrated in FIG. 3 can basically be constructed in the same way as the transmitter S1 shown in FIG. 4.

Figure 5:
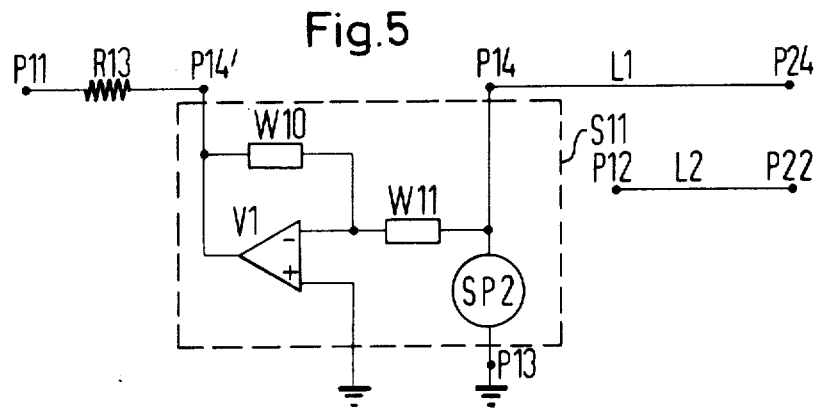
FIG. 5 is a schematic diagram of an embodiment of two voltage sources arranged in the transmitter with an operational amplifier connected as an inverter.

FIG. 5 shows an exemplary embodiment of the transmitter S11 discussed in connection with FIG. 4, in which the voltage tapped from the one pole of the voltage source SP2 is reversed in polarity using operational amplifier V1 and the impedances W10, W11, so that voltages of reverse polarity are produced at terminals P14′ and P14. The operational amplifier V1 possesses a non-inverting channel which at its input is connected to ground and is designated by a plus sign, and possesses an inverting channel which at its input is connected to the two impedances W10 and W11 and is designated by a minus sign. The embodiment shown in FIG. 5 proves valuable in particular when data signals containing d.c. voltages are transmitted through the lines L1 and L2.

Figure 6:
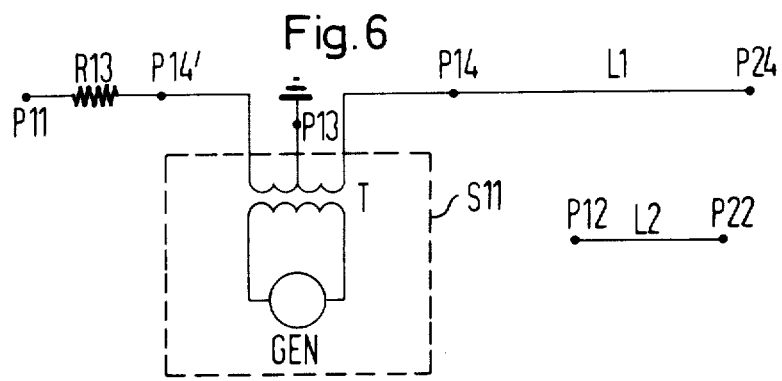
FIG. 6 is a schematic diagram illustrating another exemplary embodiment of two voltage sources connected in the transmitter using a transformer.

FIG. 6 schematically illustrates another exemplary embodiment of transmitter S11 which was discussed in connection with FIG. 4 and in which the two voltage sources are realized using the transformer T. At the primary end, the transformer T is connected to the generator GEN which produces the data signals to be transmitted. At the secondary end, the secondary coil is connected across the two terminals P13 and P14′ and across the terminals P13 and 14. Across these two sets of secondary terminals, respectively, voltages of reverse polarity arise, corresponding to the data signals produced by the generator GEN.

Figure 7:
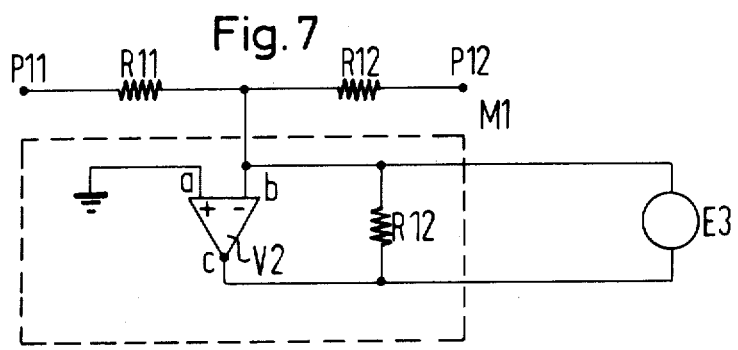
FIG. 7 is a schematic diagram of an embodiment of a current measuring device which is used in the data transmission system illustrated in FIG. 3.

FIG. 7 is a detailed showing of an exemplary embodiment of the measuring device M1 schematically illustrated in FIG. 3. This measuring device comprises operational amplifier V2 and resistor R12. The operational amplifier V2 has an input $a$ which is connected via a non-inverting channel to an output $c$, and has a input $b$ which is connected via an inverting channel also to the output $c$. The input $a$ is connected to ground and thus to a circuit point of constant potential. The entirely or partially compensating currents are conducted through terminals P11 and P12. Thus, via the output $c$, the operational amplifier V1 emits a signal which is dependent upon the difference between the currents flowing through terminals P11 and P12. This signal serves to control the device E3. The measuring device M1 and the device E3 thus together form the receiver E11 shown in FIG. 3. The measuring device M2 schematically illustrated in FIG. 3 can be of similar construction to the measuring device M1 shown in FIG. 7.

The embodiments described hereinabove are preferred forms of construction according to the principles of the invention, and they are to be considered only as being exemplary. It is contemplated that the construction, arrangement or operating parameters of the described embodiments can be modified or changed in a variety of ways known to those skilled in the art, while remaining within the scope of the invention, as defined by the appended claims.

I claim:
1. A circuit arrangement for two-wire, full duplex data transmission via two lines connecting at least two stations, wherein each said station comprises:
receiver means connected to a first terminal, to a second terminal which is connected to one of said two lines and to a reference potential,
transmitter means connected between a third terminal and said reference potential,
balancing resistance means connected between said first and third terminals, said third terminal being connected to the other of said two lines and
measuring means in said receiver means coupled to said first and second terminals so as to be responsive, respectively, to a first current flowing through said transmission means, said balancing resistance means, said first terminal and said receiver means to said reference potential and a second current flowing through said transmission means, said two lines, said second terminal and through said receiver means to said reference potential, said mea- suring means including means for generating a measuring signal for facilitating the reception of data, said measuring signal having a value indicating the difference between the values of said first and second currents if the algebraic signs of said first and second currents are the same and for indicating the sum of said first and second currents if the algebraic signs of said first and second currents are different.

2. The circuit arrangement defined in claim 1 wherein said transmitter means comprises first and second voltage sources, wherein said first terminal comprises first and second connecting points, said first connecting point being connected to said balancing resistance means and said second connecting point being connected to said other line, said first voltage source being connected with a terminal of one polarity to said first connecting point and said second voltage source being connected with a terminal of the opposite polarity to said second connecting point, said first and second voltage sources being otherwise connected to said reference potential, and wherein said measuring means produces a measuring signal which is the sum of the values of the currents flowing through said first and second voltage sources.

3. The circuit arrangement defined in claim 2 wherein one of said voltage sources is a voltage inverter connected to the other of said voltage sources and said connecting point.

4. The circuit arrangement defined in claim 3 wherein said voltage inverter comprises an operational amplifier having a non-inverting input connected to said reference potential and an inverting input connected to the output of said other voltage source and to the output of said operational amplifier.

5. The circuit arrangement defined in claim 1 wherein said first terminal comprises first and second connecting points, said first connecting point being connected to said balancing resistance means and said second connecting point being connected to the other of said lines wherein said transmitter comprises a transformer and a data generator connected across the primary coil of said transformer, the secondary coil being connected between said first and second connecting points and having an intermediate tap connected to said reference potential.

6. The circuit arrangement defined in claim 1 wherein said measuring means comprises:
an operational amplifier having a non-inverting input connected to said reference potential and an inverting input coupled to said first and second terminals, and
impedance means connected between said inverting input and the output of said operational amplifier, the remainder of said receiver components being connected across said inpedance means.

* * * * *